United States Patent [19]

McKavanagh

[11] Patent Number: 4,895,181

[45] Date of Patent: Jan. 23, 1990

[54] GATE VALVE

[75] Inventor: Thomas P. McKavanagh, Aurora, Canada

[73] Assignee: The Clarkson Company, Sparks, Nev.

[21] Appl. No.: 274,349

[22] Filed: Nov. 21, 1988

[51] Int. Cl.⁴ ............................ F16K 3/02; F16L 7/00
[52] U.S. Cl. .................................. 137/375; 138/94.3; 251/195; 251/327; 251/328
[58] Field of Search .............. 251/174, 326, 327, 328, 251/190, 195, 329; 138/94.3; 137/375

[56] References Cited

U.S. PATENT DOCUMENTS

| 2,873,943 | 2/1959 | Williams | 251/328 |
| 3,000,608 | 9/1961 | Williams | 251/328 |
| 3,207,471 | 9/1965 | Williams | 251/328 |
| 3,333,816 | 8/1967 | Williams et al. | 251/328 |
| 4,201,365 | 5/1980 | Paptzun et al. | 251/328 |
| 4,257,447 | 3/1981 | Clarkson | 251/328 |
| 4,603,864 | 8/1986 | Raftis | 251/328 |
| 4,623,122 | 11/1986 | Gambetta | 251/328 |
| 4,625,942 | 12/1986 | Nelson | 251/328 |
| 4,688,597 | 8/1987 | Clarkson et al. | 251/328 |

FOREIGN PATENT DOCUMENTS

| 572460 | 4/1959 | Belgium | 251/328 |
| 594386 | 6/1959 | Italy | 251/328 |

Primary Examiner—George L. Walton
Attorney, Agent, or Firm—Nies, Webner, Kurz & Bergert

[57] ABSTRACT

A packingless gate valve comprises a housing having two opposed resilient sleeve units that compressibly engage end to end in the valve open condition and engage opposite sides of the gate in the valve closed condition. Each sleeve unit is a resilient annular body formed at one end with an axially projecting seal lip near the inner periphery and has a stiffener ring enclosed adjacent the outer periphery at the one end. An integral gasket forming flange is formed on the other end of the sleeve body.

19 Claims, 2 Drawing Sheets

GATE VALVE

BACKGROUND AND SUMMARY OF THE INVENTION

The present invention relates to a gate valve having special internal sleeve arrangements for sealing in all operative positions of the gate. The valve of the invention is particularly adapted for the control of abrasive slurries and the like, but may be used for any fluid control. The invention is effectively an improvement over the type of valve disclosed in Clarkson U.S. Pat. No. 4,257,447 issued Mar. 24, 1981, differing thereover mainly in the internal sleeve arrangement with its enclosed stiffening element.

The above-identified Clarkson patent discloses a gate valve wherein a reinforcing ring is mounted at the outer periphery of an internal sleeve, with an axially extending annular lip on the end of the sleeve at the gate, and with similarly constructed sleeves at both sides of the gate in a valve assembly.

Previous valve configurations in which at least one sleeve or seal member having an enclosed ring is employed with a valve closure member are described in the following U.S. Pat. Nos.: 2,873,943 to Williams; 3,659,822 to Nagy; 4,201,365 to Paptzun et al.; 4,603,864 to Raftis; 4,623,122 to Gambetta; and 4,625,942 to Nelson.

The present invention distinguishes over the aboveidentified Clarkson patent and the other patents mentioned above by providing a special sleeve structure at opposite sides of the gate having a novel arrangement of a stiffening element enclosed within each sleeve.

It is therefore a major object of the invention to provide a novel valve assembly wherein resilient sleeve units at opposite sides of the gate have a special configuration of a stiffening unit enclosed within each sleeve.

A further object of the invention is to provide a novel gate valve assembly wherein the inner ends of axially compressed sleeve units engage opposite sides of the gate in the valve closed condition and sealingly engage each other in the valve open condition, and are of special structure providing improved coaction between the sleeve units and the relatively slidable gate.

Another object of the invention is to provide a novel gate valve assembly wherein each sleeve end adjacent the gate has an encircling thin reinforcing band of metal or the like that is enclosed within the sleeve in proximity to a radially extending gate engaging and guiding surface.

A further object of the invention is to provide as a removable and replaceable subassembly for a gate valve a novel sleeve unit that includes a resilient cylindrical sleeve body having at the end adjacent to the gate an axially extending annular compressible sealing lip and a stiffening strip or band of metal or the like in proximity to that end and completely enclosed within the sleeve body. Pursuant to this object the lip may be an annular rounded end formation projecting axially from the sleeve end at the inner periphery, and the guide surface may be provided by enclosing within the outer periphery of the sleeve at that end an annular strip of thin metal or similar material. Also the opposite end of the sleeve body may be formed with an integral radial flange adapted to be compressed between the valve housing and the pipeline when installed.

Further objects of the invention will appear as the description proceeds in association with the appended claims and the accompanying drawings.

DESCRIPTION OF THE PREFERRED EMBODIMENTS

Figure 2:
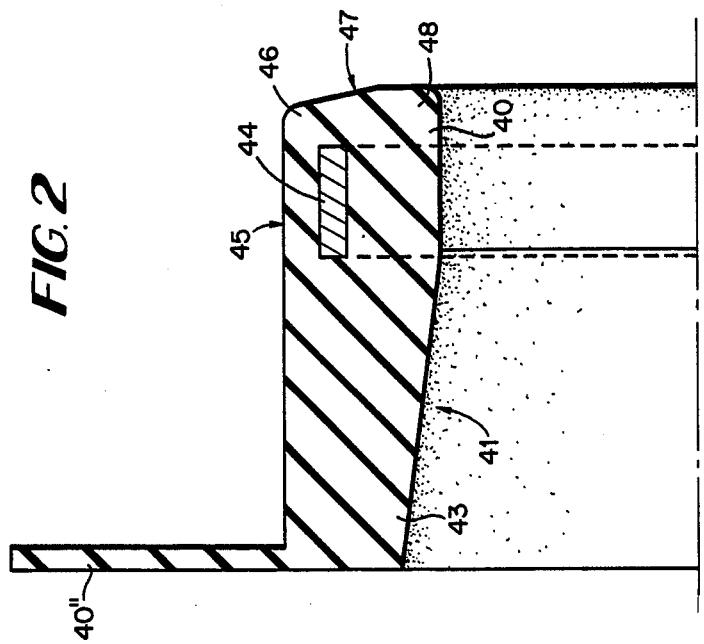
FIG. 2 is a partial elevation in cross section showing details of the gate valve sleeve with the enclosed stiffener ring.

Referring to the drawings the valve assembly comprises a housing 11 adapted to be inserted coaxially into a pipeline. The movable valve element comprises a flat smooth imperforate plate gate 13 of uniform thickness mounted for reciprocal movement in and out of the fluid flow path through the housing 11.

The actuator for the gate 13 may be any suitable conventional means such as a pneumatic or hydraulic cylinder containing a piston rod. In such a system, upon selective admission of fluid under pressure to the cylinder chambers at opposite sides of the piston, the gate 13 may be moved between the pipeline open position of FIG. 3 and the closed position of FIG. 4 later to be described in more detail. Further description of the actuator and its function are not necessary to understand the invention which relates essentially to the valve structure within the housing, and its cooperation with gate 13. The actuator may be mounted on the housing by a frame fixed at its lower end on the housing as by bolts 21 which as will appear may be two of the bolts holding the housing halves together.

Figure 1:
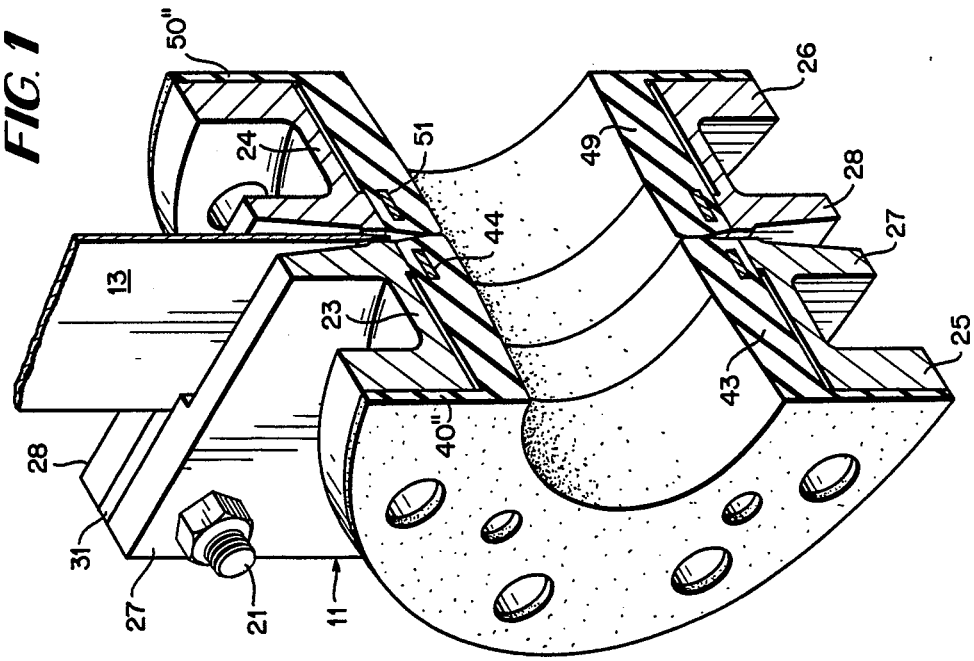
FIG. 1 is a perspective half-section through the valve body showing detail of the invention.

Housing 11 comprises opposed similar halves 23 and 24 having respective outer circular radial flanges 25 and 26 and inner rectangular radial flanges 27 and 28. Inner flanges 27 and 28 are rectangular and of the same size and as shown in FIG. 1 of larger area than flanges 25 and 26. The housing halves are rigidly secured together as by a series of bolts 21 extending through the adjacent inner flanges 27 and 28. Inner flanges 27 and 28 abut flush upon the opposite sides of two flat uniform thickness spacer strips 31 which are disposed between the housing halves at opposite sides to maintain between them a narrow space of sufficient width to pass gate 13 in operation as will appear. In this respect the housing is like that of U.S. Pat. Nos. 3,945,604 and 4,257,447 which are incorporated herein by reference and to which reference is made for further detail. This gate passage or chamber space dimension is indicated at 33 in FIGS. 3 and 4 and it is of course of a fixed width slightly greater than the width of gate 13 when the bolt assemblies 21 are drawn tight. The housing halves are preferably machined metal castings.

Figure 4:
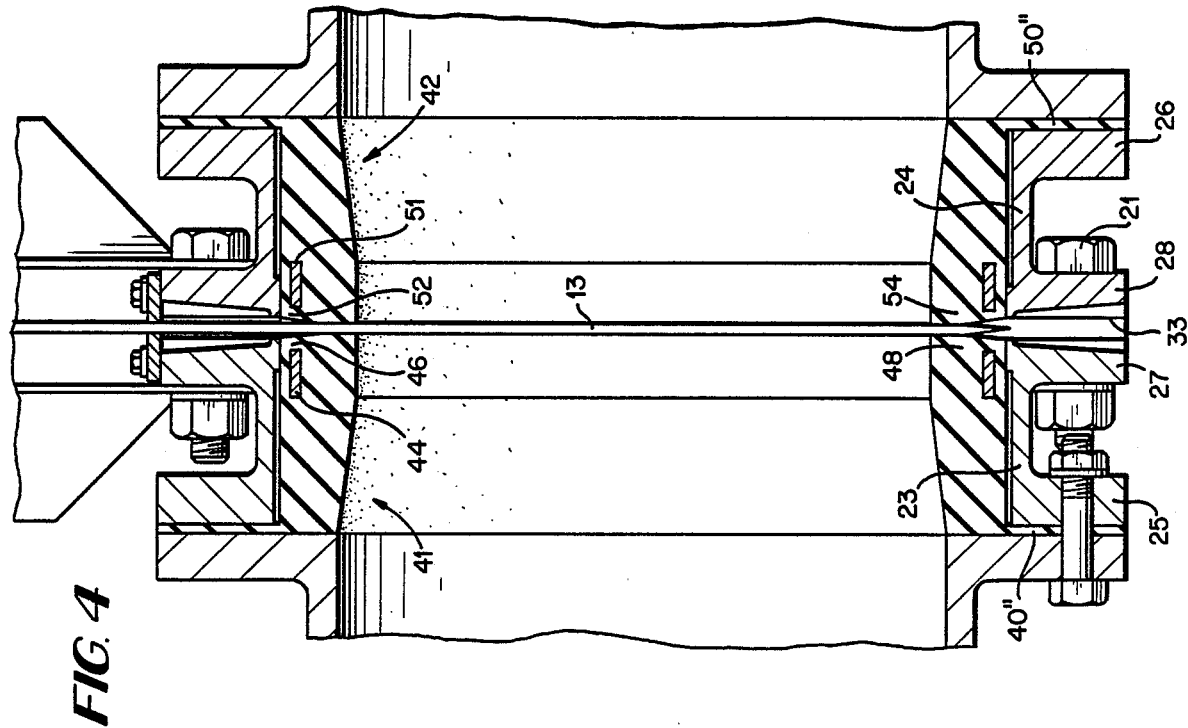
FIGS. 3 and 4 are sections showing the valve in the fully open and fully closed conditions respectively.
Figure 3:
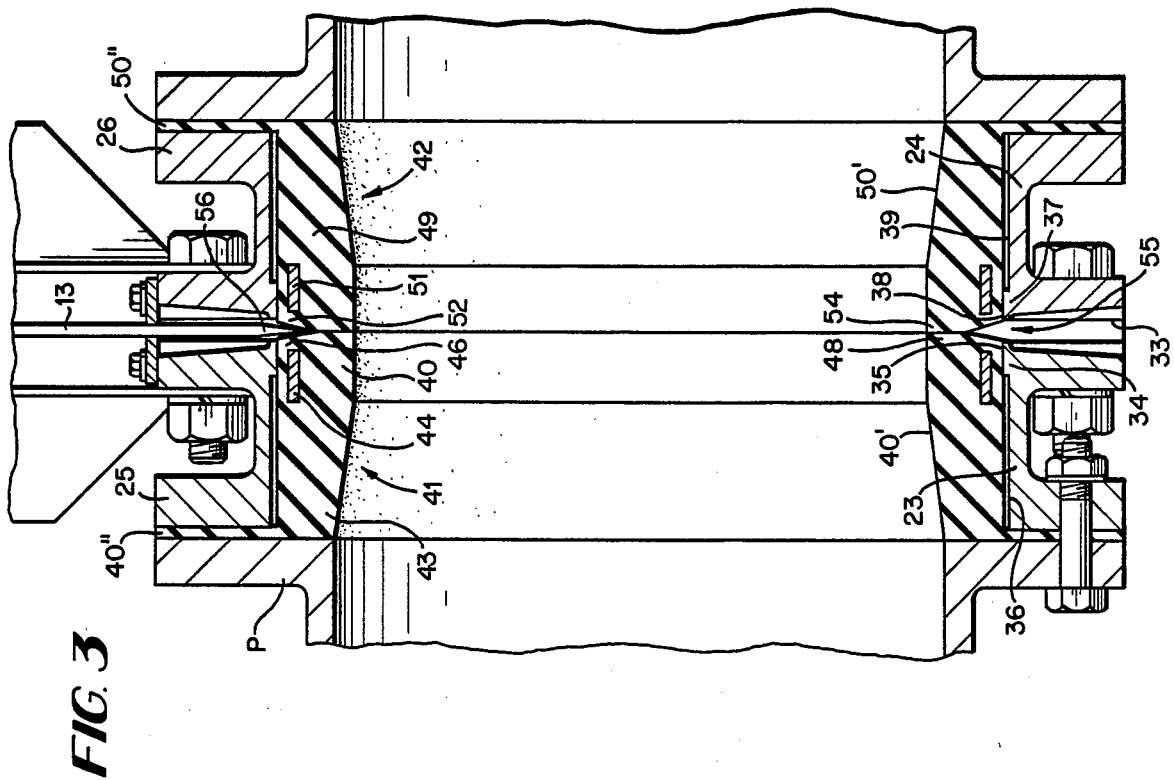

As shown in FIGS. 3 and 4, the inner periphery of housing 23 is formed with a laterally inner circular rib 34 that is accurately machined to provide a smooth cylindrical surface 35 of predetermined diameter. Axially outwardly of rib 34 the inner periphery of the housing half is recessed to provide a continuous shallow annular recess or space indicated at 36. Similarly the inner rib 37 of housing half 24 is machined to provide a smooth cylindrical surface 38, and an annular recess or space 39 is provided axially outwardly of this rib. In the assembly of FIGS. 3 and 4, cylindrical surfaces 35 and 38 are of the same size and are coaxial.

Sealing sleeve units 41 and 42 are mounted in the respective housing halves. Sleeve unit 41 comprises an annular resilient body 43 of an elastomeric material such as a synthetic rubber and is of substantially uniform radial cross section at its inner end 40. Axially outwardly of portion 40, the inner periphery of body 43 conically tapers decreasingly as indicated at 40'. On the inner end of body 43 it is reinforced by an annular shaped stiffener ring in the form of an annular strip or band 44 enclosed within the sleeve body adjacent the outer periphery 46 thereof and in proximity to a radially extending gate engaging and guiding surface 47 of the sleeve, as shown in FIG. 2. Preferably ring 44 is of a metal such as mild steel. In some instances ring 44 may be of hard polyurethane or equivalent plastic. The outer diameter of ring 44 is cylindrical and the ring 44 is completely enclosed within the sleeve body 43 so that the ring 44 does not directly engage any components exterior to the sleeve body 43. Placement of the stiffener ring 44 within the sleeve body 43 prevents the ring 44 from being subjected to the corrosive effects of liquid materials carried by the pipeline.

It will be noted that space 36 surrounds sleeve body 43 and extends between the housing half 23 and the axially outer part of sleeve body 43 when the sleeve is mounted in housing half 23, as shown in FIG. 3.

As shown in FIG. 2, the stiffener ring 44 is positioned in the axially inwardly half of the sleeve body 43 away from the axially outer flange 40" end, with the radial center of the ring 44 referably located approximately one-third (⅓) the distance from the outside diameter to the inside diameter of the elastomer sleeve.

In one embodiment, the ring 44 is positioned within the sleeve body 43 so that the ring 44 is approximately equidistant from the radially exterior surface 45 and the axially inwardly surface 47 of the sleeve body 43 as shown in FIG. 2. Sufficient sleeve material should be provided both axially inwardly and radially outwardly of the ring 44 to allow the sleeve to be resilient in such directions relative to the ring 44.

As shown in FIG. 2, the size of the stiffener ring 44 in cross section is such that the axial length may be from about ¼ to ⅓ the axial length of the sleeve body 43, while the radial dimension or thickness of the ring 44 may be about 1/5 to ¼ the radial thickness of the sleeve body 43 from the inside diameter to the outside diameter of the sleeve body 43.

Radially inwardly of ring 44, the end of rubber body 43 is formed with an axially inwardly extending rounded end annular lip 48 preferably disposed near the inner periphery of the sleeve. Lip 48 when relaxed extends substantially further axially than radially outer sleeve portion 46 for a purpose to appear.

As shown in FIGS. 2 and 3, sleeve unit 41 is also formed at its axially outer end with a thin integral radial flange 40" of about the same outer diameter as housing flange 25. When the parts are in assembly before introduction into a pipeline, flange 40" may be spaced axially from flange 25 but when the valve assembly is in the pipeline, sleeve flange 40" is compressed between flange 25 and the adjoining flange (FIG. 3) of pipeline P.

Similarly, sleeve unit 42 is an annular resilient body 49 carrying a stiffener ring 51 adjacent its outer periphery 52. The relationship of sleeve body 49 and stiffener ring 51 is the same as that for sleeve body 43 and ring 44. Axially inwardly of ring 51 the resilient body 49 is formed with an annular axially projecting rounded end lip 54 like lip 48. The sleeve body is of uniform radial cross section where it encloses ring 51 and tapers axially outwardly therefrom at its inner outer peripheral portion 50', similarly to the sleeve at the other side. The outer diameter of radially outer sleeve portion 52 is such as to fit smoothly within the machined surface 38 of the housing half. An integral radial flange 50" is formed on the axially outer end of body 49 and it serves the same function as flange 40" of body 43.

In practice sleeve units 41 and 42 may be identical and interchangeable, so that inventory may be held to a minimum.

When the sleeve units 41 and 42 are mounted within the housing, with the housing halves bolted together but not yet installed in a pipeline, the parts are positioned so that sleeve end lips 48 and 54 are coaxially aligned and preferably in light compressive contact. The valve is open. At this time the distance 55 between sleeve end faces 46 and 52 is usually greater than the thickness of the gate plate 13.

When the open valve is mounted in the pipeline (FIG. 3) flanges 40" and 50" are clamped, the sleeve bodies are compressed and axially shortened so that the space between faces 46 and 52 is shortened to less than the thickness of gate 13, and lips 48 and 54 are compressibly engaged over a considerable annular area and sufficiently to form an annular seal against escape of fluent material passing through the valve. Excess sleeve material may displace into recesses 36 and 39.

The lower edge of gate plate 13 is tapered to provide a relatively sharp, straight knife edge as shown at 56, and initially may extend within space 55 but not far enough to appreciably forcibly engage faces 46 and 52. This is the normal valve open condition of the valve assembly operably mounted in a pipeline, wherein the gate has not yet effectively penetrated the sleeve seals.

FIGS. 3 and 4 show in succession the coaction of the gate and sleeve seals as the valve undergoes a closing operation.

In FIG. 3 following activation of the gate actuator, the descending gate lower edge enters and forces apart the upper sector of the sleeve as it is slidably disposed between sleeve end faces 46 and 52 and then forces apart the lips 48 and 54.

As the gate moves down, the sleeve faces 46, 52 with enclosed stiffener rings 44, 51 are forcibly moved away from each other thereby increasing the axial compression in the elastic sleeve bodies while somewhat relieving the sealing compression between lips 48 and 54 so that the tapered lower knife edge of the plate may more easily separate the lips. This in turn reduces friction between the downwardly moving gate, which is slidably guided between sleeve end faces 46 and 52, and the opposing lips. The stiffener rings thereby assist in providing for good smooth reduced friction sliding contact with the gate.

As the gate 13 penetrates further toward the closed position (FIG. 4) the seal between lips 48 and 54 is progressively parted, while the relatively soft sleeve material effectively flows around the knife edge. The combination of the knife edge and the gate and the soft compressible material of the sleeve lips prevents any leakage from the valve during gate closing and opening operations.

FIG. 4 shows the gate in the final closed valve position. By this time the knife edge has passed the lower sector of the seal lips 48 and 54 and the gate is disposed between them, while the knife edge projects into the space below. At this time the opposed flat smooth side surfaces of the gate plate 13 are uniformly engaged under compression by the compressed seal lips, which may even be substantially flattened as shown, so that there is a complete annular seal of good radial extent within the valve. At this time the seal lips are in uniform maximum compression, and the internal pressure of the fluid or slurry in the pipeline will further force the upstream sleeve lips into engagement with the gate 13, so that there is no leakage in the valve closed position, this action being aided by the tapered inner surface portion of the sleeve.

During movement of the gate 13 from the closed position of FIG. 4 to the open position of FIG. 3 substantially the reverse of the above takes place, the resiliency of the seal material maintaining leaktight sealing sliding contact between lips 48 and 54 until the gate is withdrawn from between the lips.

The valve of the invention is a two-way valve, that is it may control flow in either direction in the pipeline and may be reversed end for end. The sleeve units 41 and 42 are essentially identical so that either may be reversed and function as above in the assembly. The individual sleeve units are readily removed and replaced when damaged or worn.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secure by Letters Patent is:

1. A packingless gate valve assembly comprising two body housing members having coaxial through passages, means securing said housing members together in end to end relation with means therebetween to define a relatively narrow transverse gate chamber, annular sleeve units lining each of said passages, each of said sleeve units extending into said chamber in the form of annular resilient lips adapted to sealingly engage each other under compression in the open position of said valve, and an imperforate gate slidable through said chamber between a valve open position where it does not block fluid flow through said passages and a valve closed position wherein it is interposed between said sealing lips, each of said sleeve units comprising an axially compressible annular body of elastomeric material, and there being a thin stiffening ring of harder material enclosed within each sleeve body adjacent the radially outer periphery of each body at the gate engaging end, each of said sleeve bodies having its radially outer periphery formed to intersect with its gate engaging end in a rounded continuous surface, each of said stiffening rings being positioned approximately equidistant from the radially outwardly surface and the axially inwardly surface of the respective sleeve body and wherein the size of each of said stiffener rings in cross section is such that the axial length of each of said rings is about ¼ to ⅓ the axial length of the respective sleeve body, and with the radial dimension or thickness of each of said rings being about 1/5 to ¼ the radial thickness of the respective sleeve body from the inside diameter to the outside diameter of said sleeve body, whereby the inner faces of said sleeve bodies axially inwardly of the respective stiffening rings are forcibly moved away from each other as the gate moves to a closed position, thereby increasing the axial compression in said sleeve bodies.

2. The valve assembly of claim 1 wherein each of said sleeve units has tapered annular internal peripheral portions at the outer ends whereby each said unit is of increasing internal diameter toward the outer end of the associated passage.

3. The valve assembly of claim 1 wherein each of said sealing sleeve units is a unitary axially compressible annular body.

4. The valve assembly of claim 1 wherein each said stiffening ring is of mild steel.

5. The valve assembly of claim 1 wherein each said stiffening ring is of hard polyurethane.

6. The valve assembly of claim 1 including means for securing the end of each said sleeve that is longitudinally remote from said chamber to a body housing member.

7. The valve assembly of claim 1 wherein at least one of said stiffening rings is positioned in the axially inwardly half of the respective sleeve body, with the radial center of said at least one ring located approximately one-third (⅓) the distance from the outside diameter to the inside diameter of the sleeve body.

8. The valve assembly of claim 1 wherein sufficient sleeve material is provided for the respective sleeve bodies both axially inwardly and radially outwardly of said respective rings to allow the sleeves to be resilient in such directions relative to said rings.

9. In a gate valve assembly, two hollow housing members having coaxial cylindrical passages rigidly secured together end to end with axial spacer means between them defining a relatively narrow transverse gate receiving and guiding space disposed normal to said passages, sleeve units comprising annular bodies of greater axial length than said space lining each of said passages and having at one end annular resilient end lips that in the valve open position extend through said space into sealing engagement with each other, a reinforcing ring enclosed within each of said sleeves radially outwardly of its associated lip on the sleeve end, each of said lips projecting axially beyond its associated ring, a gate member having an imperforate portion slidable in said space between a valve closed position wherein it blocks flow through said valve and a valve open position wherein it permits unobstructed flow through said valve, said lips being sufficiently resilient to permit sliding movement of the gate member between said positions and being compressed in resilient sealing engagement with the sides of said gate member in the valve closed position, each of said sleeve bodies having its radially outer periphery formed to intersect with its gate engaging end in a rounded continuous surface, each of said reinforcing rings being positioned approximately equidistant from the radially outwardly surface and the axially inwardly surface of the respective sleeve body and wherein the size of each of said reinforcing rings in cross section is such that the axial length of each of said rings is about ¼ to ⅓ the axial length of the respective sleeves body, and with the radial dimension or thickness of each of said rings being about 1/5 to ¼ the radial thickness of the respective sleeve body from the inside diameter to the outside diameter of said sleeve body, whereby the inner faces of said sleeve bodies axially inwardly of the respective reinforcing rings are forcibly moved away from each other as the gate moves to a closed position, thereby increasing the axial compression in said sleeve bodies.

10. The gate valve of claim 9 wherein each said ring is of a material of greater hardness than the sleeve body.

11. The gate valve of claim 9 wherein each said ring is of mild steel.

12. The gate valve of claim 9 wherein each said ring is of hard polyurethane.

13. The gate valve of claim 9 wherein at least one of said reinforcing rings is positioned in the axially inwardly half of the respective sleeve body, with the radial center of said at least one ring located approximately one-third (⅓) the distance from the outside diameter to the inside diameter of the sleeve body.

14. The gate valve of claim 9 wherein sufficient sleeve material is provided for the respective sleeve bodies both axially inwardly and radially outwardly of said respective rings to allow the sleeves to be resilient in such directions relative to said rings.

15. A sleeve subassembly for a gate valve passage comprising an annular sleeve body of resilient material having an annular passage engaging outer periphery and an end that is to be adjacent the gate provided with a reinforcing ring in the form of a shaped annulus of thin wear resistant material consisting mainly of a peripheral band section enclosed within the sleeve body adjacent the outer periphery of the sleeve body, and an integral annular seal lip on said body end disposed radially inwardly of and projecting axially inwardly beyond said ring, the radially outer periphery of said sleeve body being formed to intersect with said body end in a rounded continuous surface, wherein said reinforcing ring is positioned approximately equidistant from the radially outwardly surface and the axially inwardly surface of the sleeve body and wherein the size of said reinforcing ring in cross section is such that the axial length of said ring is about ¼ to ⅓ the axial length of the sleeve body, and with the radial dimension or thickness of said ring being about 1/5 to ¼ the radial thickness of the sleeve body from the inside diameter to the outside diameter of said sleeve body, whereby the inner face of said sleeve body axially inwardly of the reinforcing ring is forcibly moved axially outwardly as the gate moves to a closed position, thereby increasing the axial compression in said sleeve body.

16. The sleeve subassembly of claim 15, wherein said body is rubber and said ring is of mild steel.

17. The sleeve subassembly of claim 15 wherein said body is rubber and said ring is of hard polyurethane.

18. The sleeve subassembly of claim 15 wherein said reinforcing ring is positioned in the axially inwardly half of the sleeve body, with the radial center of the ring located approximately one-third (⅓) the distance from the outside diameter to the inside diameter of the sleeve body.

19. The sleeve subassembly of claim 15 wherein sufficient sleeve material is provided both axially inwardly and radially outwardly of said reinforcing ring to allow the sleeve to be resilient in such directions relative to said ring.

* * * * *